(12) United States Patent
Berheide et al.

(10) Patent No.: US 8,546,749 B2
(45) Date of Patent: Oct. 1, 2013

(54) INTRINSIC RADIOACTIVITY IN A SCINTILLATOR AS COUNT RATE REFERENCE

(75) Inventors: Markus Berheide, Medford, MA (US); James A. Grau, Marshfield, MA (US); Bradley Albert Roscoe, Cambridge, MA (US); Peter Wraight, Skillman, NJ (US)

(73) Assignee: Schlumberger Technology Corporation, Cambridge, MA (US)

( * ) Notice: Subject to any disclaimer, the term of this patent is extended or adjusted under 35 U.S.C. 154(b) by 650 days.

(21) Appl. No.: 12/713,746

(22) Filed: Feb. 26, 2010

(65) Prior Publication Data

US 2010/0301198 A1    Dec. 2, 2010

Related U.S. Application Data

(63) Continuation-in-part of application No. 12/268,211, filed on Nov. 10, 2008, now Pat. No. 8,173,953.

(60) Provisional application No. 61/224,635, filed on Jul. 10, 2009.

(51) Int. Cl.
  *G01V 5/00* (2006.01)
  *G01V 5/04* (2006.01)
  *G01D 18/00* (2006.01)

(52) U.S. Cl.
  USPC ........ 250/262; 250/252.1; 250/253; 250/260; 250/261

(58) Field of Classification Search
  USPC .................. 250/252.1, 253–266, 361 R, 395
  See application file for complete search history.

(56) References Cited

U.S. PATENT DOCUMENTS

| | | | |
|---|---|---|---|
| 3,922,541 A | 11/1975 | Seeman | |
| 4,346,590 A | 8/1982 | Brown | |
| 4,958,080 A | 9/1990 | Melcher | |
| 5,023,449 A | 6/1991 | Holenka et al. | |
| 5,132,540 A * | 7/1992 | Adolph et al. | 250/369 |
| 5,206,174 A * | 4/1993 | Gehrke et al. | 436/58 |
| 5,326,970 A | 7/1994 | Bayless | |
| 5,360,975 A | 11/1994 | Stoller | |
| 5,406,078 A | 4/1995 | Jacobson | |

(Continued)

FOREIGN PATENT DOCUMENTS

| | | |
|---|---|---|
| EP | 640848 B1 | 6/1998 |
| WO | 2005116692 A1 | 12/2005 |

OTHER PUBLICATIONS

International Search Report of PCT Application No. PCT/US2009/062457 dated Jun. 15, 2010: pp. 1-3.

(Continued)

*Primary Examiner* — Michael G Lee
*Assistant Examiner* — Laura Gudorf
(74) *Attorney, Agent, or Firm* — Jeremy Berman

(57) ABSTRACT

Methods and related systems are described for the detection of nuclear radiation. The system can include a scintillator material that intrinsically generates radiation and a photodetection system coupled to the scintillator material and adapted to generate electrical signals based on light emitted from the scintillator material. A processing system adapted and programmed to receive the electrical signals, to generate a count rate reference value based at least in part on electrical signals generated in response to the light emitted from the scintillator material due to the intrinsically generated radiation.

49 Claims, 8 Drawing Sheets

(56) References Cited

U.S. PATENT DOCUMENTS

| | | | |
|---|---|---|---|
| 5,635,712 | A | 6/1997 | Scott, III et al. |
| 6,051,830 | A | 4/2000 | Moake |
| 6,064,068 | A | 5/2000 | Bartle |
| 6,389,367 | B1 | 5/2002 | Plasek |
| 7,067,816 | B2 | 6/2006 | Dorenbos et al. |
| 7,081,616 | B2 | 7/2006 | Grau et al. |
| 7,084,403 | B2 | 8/2006 | Srivastava et al. |
| 7,129,495 | B2 | 10/2006 | Williams et al. |
| 7,202,456 | B2 | 4/2007 | Mickael |
| 7,297,954 | B2 | 11/2007 | Kurashige et al. |
| 7,485,868 | B2 | 2/2009 | Stein et al. |
| 8,173,953 | B2 | 5/2012 | Stoller et al. |
| 8,237,128 | B2 * | 8/2012 | Steadman Booker et al. .............. 250/370.09 |
| 2004/0149917 | A1 | 8/2004 | Dorenbos et al. |
| 2004/0217292 | A1 | 11/2004 | Moyers et al. |
| 2005/0082484 | A1 | 4/2005 | Srivastava et al. |
| 2006/0065821 | A1 | 3/2006 | Stam et al. |
| 2006/0065824 | A1 | 3/2006 | Mickael |
| 2006/0102845 | A1 | 5/2006 | Williams et al. |
| 2006/0219927 | A1 * | 10/2006 | Venkataramani et al. .............. 250/370.11 |
| 2008/0001087 | A1 * | 1/2008 | Srivastava et al. ........ 250/361 R |
| 2008/0121817 | A1 * | 5/2008 | Becker et al. ............ 250/483.1 |
| 2008/0191140 | A1 | 8/2008 | McDevitt et al. |
| 2008/0251709 | A1 | 10/2008 | Cooke et al. |
| 2009/0039269 | A1 | 2/2009 | van Eijk et al. |
| 2009/0097613 | A1 * | 4/2009 | Tonami .......................... 378/19 |
| 2010/0116978 | A1 | 5/2010 | Stoller et al. |
| 2010/0301198 | A1 | 12/2010 | Berheide et al. |

OTHER PUBLICATIONS

International Search Report of PCT Application No. PCT/US2010/041491 dated Jan. 25, 2011: pp. 1-3.

International Search Report of PCT Application No. PCT/US2010/041476 dated Feb. 28, 2011: pp. 1-3.

Examination Report of Canadian Application No. 2,743,051 dated Jan. 17, 2013: pp. 1-3.

* cited by examiner

INTRINSIC RADIOACTIVITY IN A SCINTILLATOR AS COUNT RATE REFERENCE

CROSS REFERENCE TO RELATED APPLICATIONS

This patent application is a continuation-in-part of U.S. patent application Ser. No. 12/268,211 filed Nov. 10, 2008, which is incorporated by reference herein and claims priority to provisional application No. 61/224,635 filed on Jul. 10, 2009. This patent application also incorporates by reference patent application Ser. No. 12/713,495 filed Feb. 26, 2010.

BACKGROUND

1. Field

This patent specification relates to improved scintillator based radiation detection. More particularly, this patent specification relates to methods and systems for using improved energy calibration, resolution monitoring, and count rate calibration using intrinsic radiation sources.

2. Background

Scintillation detectors featuring a scintillator crystal and a photodetector (for example a PMT tube) are widely used different industries, and in particular in the field of oilfield services. A common problem in the use of scintillation detectors for nuclear spectroscopy or similar energy sensitive measurements is that the detector response function changes for example with changing environmental conditions. Typically, the sensitivity of the photodetector element will vary with time (drift) and with changing environmental conditions such as temperature and magnetic fields.

Scintillator materials are widely used to build detectors for measuring X-ray and γ-radiation. Dense materials with high atomic numbers are preferred to measure γ-rays, since the stopping power of the materials increases with these parameters and thus the size of the detector can be reduced without loss of sensitivity. However, many of the heavier scintillator materials have an intrinsic background radioactivity due to the presence of radioactive isotopes in the heavier elements of the crystal matrix. In particular Lutetium has been found to be a valuable constituent in scintillator materials, but suffers from the presence of a radioactive isotope. In large detectors this background count rate might contribute significantly to the maximal achievable count rate and thus negatively affect the precision and accuracy of the measurement. For example lutetium oxyorthosilicate (LSO) has been established as a useful scintillator for medical imaging, but its intrinsic radioactivity affects the count rate in large scintillator crystals. More recently LuAP and LuAG have been used as matrix materials for scintillators. Typical intrinsic count rates for material containing a large fraction of Lu are around a few hundred counts per second per cubic centimeter (cm-3s−1). For example a 2"×4" crystal contains about 200 cm3 of material, so that the count rate reaches around 50,000 s−1. This is about 5-10% of the count rate capability of a fast conventional detector and thus creates a loss in statistical precision of several %. Intrinsic radioactivity is therefore conventionally regarded as a disturbance.

Dead time can be measured by placing a pulse generator (or short pulser) signal into the spectrum where it can reasonably well be distinguished from count rate related to gamma (or particle) counting. The dead time of the system can then be determined from measuring the total number of counts. An external pulser can either be an electronic component that feeds a reference signal of known and stable amplitude into the electronics of the scintillation detector or it is based on pulsed light sources where the reference optical pulse is fed somewhere into the optical system of the scintillation detector and is detected through the photon detection system.

Similarly, pileup can be measured using random pulsers with the caveat that it is difficult to create artificial events that match real radiation in timing signature and randomness of timing.

Alternatively a monoenergetic external source can be used as a reference to create a signal of known count rate in the measured spectrum. However, using an external source can lead to problems with the absolute count rate, if the geometry and the efficiency of the detector were not well known. Additionally, count rate changes can occur due to changes for example in geometry for example due to temperature expansion between external reference source and crystal.

SUMMARY

According to some embodiments, a system for the detection of nuclear radiation is provided. The system includes a scintillator material that intrinsically generates radiation; a photodetection system coupled to the scintillator material and adapted to generate electrical signals based on light emitted from the scintillator material; and a processing system adapted and programmed to receive the electrical signals, to generate a count rate reference value based at least in part on electrical signals generated in response to the light emitted from the scintillator material due to the intrinsically generated radiation.

According to some embodiments, the count rate reference is used to determine and/or correct count rates in a spectrum of external radiation. According to some other embodiments, the count rate reference is used to calculate and/or correct for dead time of the system, which can be variable and depends on a rate of external radiation. The dead time of the system under exposure to external radiation can be estimated from a comparison with dead time of a reference spectrum of the intrinsically generated radiation. According to some embodiments, the comparison is based in part on an evaluation of the counts in a spectral region not affected by expected external radiation. According to some embodiments, the comparison is based in part on a form of spectral fitting limited to a spectral region not affected by expected external radiation. According to some embodiments spectral fitting can include the use of standard spectra of the intrinsically generated radiation and at least one component from an external radiation source which is particularly advantageous if the spectra of the intrinsic and external radiation overlap.

According to some embodiments, the dead time of the reference spectrum of the intrinsically generated radiation is characterized or calibrated with an external source of known strength, or by comparing it with a reference spectrum of a substantially smaller crystal having similar resolution and that has negligible dead time. According to some other embodiments, the dead time of the reference spectrum of the intrinsically generated radiation is computed from independently known properties of electronics within the system, for example, by estimation from a series of measurements with varying electronic shaping times.

According to some embodiments, the count rate reference is used for pileup measurement and/or to make corrections for pileup. According to some embodiments, the corrections for pileup are based on measurements or a modeling simulation of processing within the system.

According to some embodiments, a pulse height spectrum of external radiation is determined.

According to some embodiments, the count rate reference is used to compute one or more parameters that effect accuracy or precision of measurement of a spectrum of an external source of radiation.

According to some embodiments, corresponding methods for the detection of nuclear radiation are also provided.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

DETAILED DESCRIPTION OF THE PREFERRED EMBODIMENTS

Figure 1:
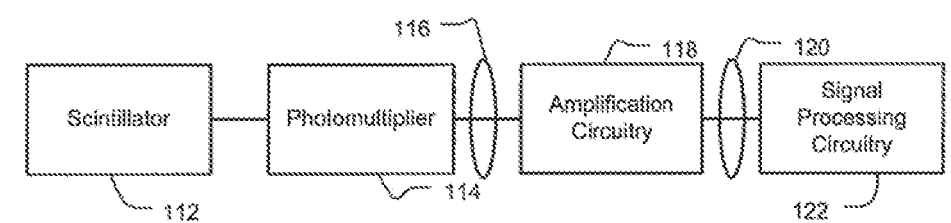
FIG. 1 is a block diagram of a gamma-ray spectroscopy system in accordance with some embodiments.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the subject matter disclosed in the application as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the subject matter disclosed in the application may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments of the subject matter disclosed in the application may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

According to some embodiments, features in a spectrum associated with a scintillation material's intrinsic radioactive decay is used for the determination of one or more parameter's of the detector response function. An advantage of some such embodiments is that the gain of the detector can be stabilized without an external stabilization source and in absence of any other external sources of radiation. For further detail in gain stabilization using a scintillation material's intrinsic activity, see U.S. application Ser. No. 12/268,211 filed Nov. 10, 2008, which is incorporated herein by reference.

An additional benefit of some embodiments is that the intrinsic material is evenly distributed within the detector material and therefore is not affected by source movement with respect to the crystal. Furthermore, according to some embodiments, it is possible to monitor the resolution of the detector over time without using an external source. In some cases, the internal spectrum contains more than one feature. In this case, according to some embodiments, multiple parameters such as but not limited to gain and/or offset and/or non-linearity can be determined at the same time. In certain cases, an estimate of higher order terms in the energy calibration and detector resolution can be provided.

It is noted that the subject matter of the application discloses at least methods and related systems are described for the detection of nuclear radiation. The method and/or system can include a scintillator material that intrinsically generates radiation and a photodetection system coupled to the scintillator material and adapted to generate electrical signals based on light emitted from the scintillator material. A processing system adapted and programmed to receive the electrical signals, to generate a count rate reference value based at least in part on electrical signals generated in response to the light emitted from the scintillator material due to the intrinsically generated radiation FIG. 1 is a block diagram of a gamma-ray spectroscopy system in accordance with some embodiments. FIG. 1 illustrates a gamma-ray spectroscopy system 110 configured for use in nuclear well logging operations. The gamma-ray spectroscopy system 110 may provide spectroscopic analysis of gamma-rays or x-rays from a surrounding geological formation or borehole to determine, among other things, a general composition of the formation. Rather than maintain an external radiation source near a scintillator for gain stabilization, the gamma-ray spectroscopy system 110 may employ a scintillator 112 having a natural radioactivity. Using techniques described below, the gamma-ray spectroscopy system 110 may stabilize the gain of the system using the natural radioactivity of the scintillator 112.

The scintillator 112 may represent any scintillator having a natural radioactivity. Thus, the scintillator 112 may represent, for example, a scintillator based at least in part on Lutetium Silicate (LSO), or Lutetium Aluminum Perovskite (LuAP), or Lutetium Aluminum Garnet (LuAG), or Lanthanum Bromide ($LaBr_3$) or Lanthanum Chloride ($LaCl_3$). Such scintillators may include those by Saint Gobain or General Electric, as generally described in U.S. Pat. Nos. 7,067,816 and 7,084,403, which are hereby incorporated by reference. Alternatively, the scintillator 112 may represent any other scintillator containing a naturally occurring radioactive isotope such as, for example, Bismuth Germanium Oxide (BGO) containing $^{207}Bi$. According to some embodiments the scintillator 112 is a pure crystal such as undoped BGO. According to some other embodiments the scintillator material such as LuAP or LuAG is doped with a material such as Cerium, Praseodymium or other similar activators.

According to some alternate embodiments, the scintillator material can be of a common type, for example an oxide or a halide (e.g. containing Cl, Br, I), which is additionally doped with a radioactive material. However, such radioactive doped scintillators can suffer from disadvantages, such as non-uniform distribution of the radioactive material. It may also negatively impact the luminescence properties of the scintillator material. Thus, according to the preferred embodiments rather than doping with a radioactive material, the scintillator material contains an element that is substantially part of the scintillator material matrix and incidentally also contains a fraction of naturally occurring radioactive isotopes. According to many embodiments, the scintillator material is selected from the group containing metallic elements. According to some more preferred embodiments, the scintillator material is selected from materials containing rare-earth elements. Even more preferably, the scintillator material is selected from materials containing lanthanides.

When a gamma-ray strikes the scintillator 112, the energy deposited by the gamma-ray may be converted into light and received by a photodetector such as a photomultiplier 114 or any other device suitable for converting light into an electrical signal like an avalanche photodiode (APD). Gamma-rays detected by the scintillator 112 may arise from external radiation or from the internal radioactivity of the scintillator 112. Thus, as described below, an external reference source of radiation may be avoided for the purpose of stabilizing the gain of the gamma-ray spectroscopy system 110. Moreover, the source of radioactivity within the scintillator 112 may be uniformly distributed throughout the scintillator 112. As such, the corresponding response of the scintillator 112 to the internal radiation source may be insensitive to non-uniformities in the light generation or transport in the scintillator 112, providing another advantage over a discrete external radiation source.

After the light output by the scintillator 112 is received by the photomultiplier 114, the photomultiplier 114 may convert the light from the scintillator 112 into an electrical signal 116. It should be understood that the gamma-ray spectroscopy system 110 may alternatively employ multi-channel plate multipliers, channeltrons, or solid state devices such as Avalanche Photo Diodes in lieu of the photomultiplier 114. The electrical signal 116 may be amplified by amplification circuitry 118, which may provide an amplified signal 120 to signal processing circuitry 122. The signal processing circuitry 122 may include a general or special-purpose processor, such as a microprocessor or field programmable gate array, and may perform a spectroscopic analysis of the electrical signal, which may include the gain stabilization techniques described herein. The signal processing circuitry 122 may additionally include a memory device or a machine-readable medium such as Flash memory, EEPROM, ROM, CD-ROM or other optical data storage media, or any other storage medium that may store data or instructions for carrying out the following techniques.

Because the output of the scintillator 112, the photomultiplier 114, and the amplification circuitry 118 may depend highly upon external factors, such as temperature, the age of internal components, or gamma-ray count rate, to name a few, the signal processing circuitry 122 may stabilize the gain of the amplified signal 120. Stabilizing the gain of the amplified signal 120 may ensure a consistent gain across variable conditions, such as variances in temperature or the age of the gamma-ray spectroscopy system 110, i.e. the electrical signal will have the same pulse height for a given amount of energy deposited in the scintillation crystal independent of temperature, age, detector count rate and other factors that can affect the total gain of the system. The gain stabilization approaches employed by the signal processing circuitry 122 may rely not on an external radiation source, but rather the natural radioactivity of the scintillator 112.

As noted above, the scintillator 112 may include a naturally radioactive material that may serve as a reference source of radiation. For explanatory purposes, the scintillator 112 may be a Lutetium Aluminum Perovskite (LuAP) or Lutetium Aluminum Garnet (LuAG) scintillator. The LuAP (or LuAG) scintillator may have a natural radioactivity as a certain isotope of Lutetium decays within the LuAP (or LuAG) scintillator. The decay of the Lutetium generates beta and gamma radiation that may interact with the scintillator 112 to generate a corresponding scintillation signal, and the resulting energy spectrum may be used to stabilize the gain of the gamma-ray spectroscopy system 110.

A number of properties may make LuAP and LuAG very well suited for logging operations. LuAP and LuAG are non-hygroscopic, and have very high stopping power due to their high density and effective Z. Additionally, LuAP and LuAG have excellent temperature characteristics and show very little loss (or even gain) of light output with temperature. There are two isotopes of Lutetium: $^{175}Lu$ (97.4%) and $^{176}Lu$ (2.6%). The latter, being radioactive, decays with a half-life $2.6 \times 10^{10}y$ to $^{176}Hf$. The radioactivity results in several hundred counts per second per cubic centimeter ($cps/cm^3$) of the LuAP or LuAG material. With the known radioactivity of LuAP (or LuAG) in the scintillator 112 as a reference, the signal processing circuitry 122 may stabilize the gain of the amplified signal 120.

Figure 2:
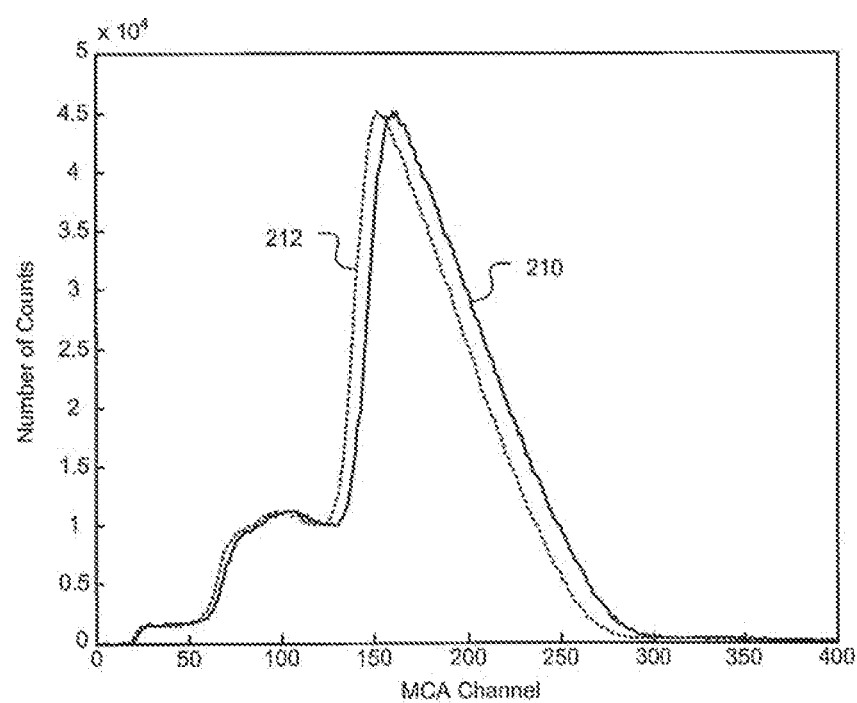
FIG. 2 is a spectrum chart showing spectra for a PR:LuAG crystal.
Figure 3:
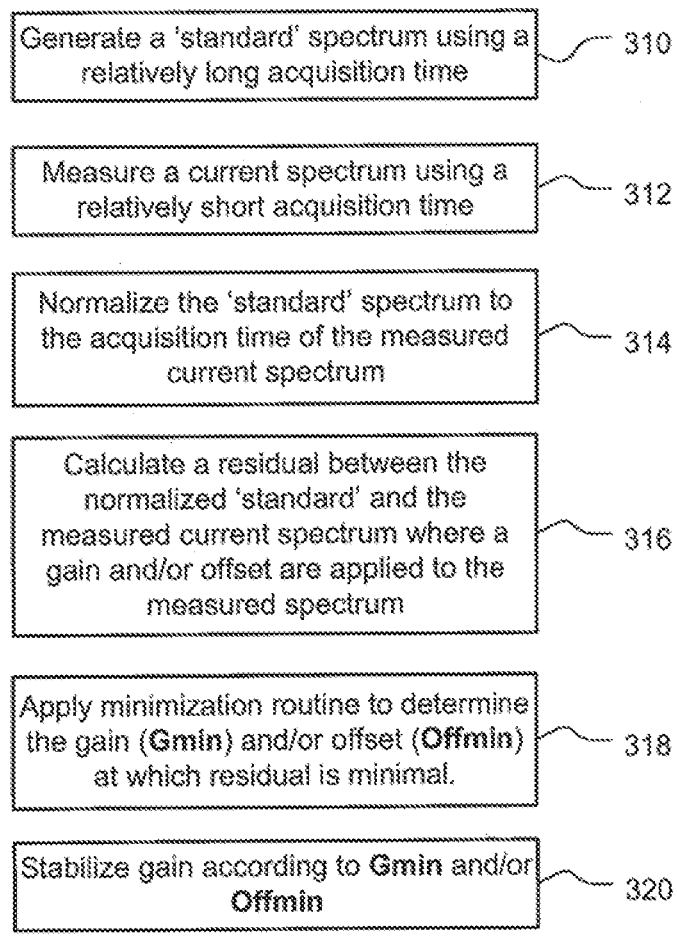
FIG. 3 is a flowchart describing a technique for stabilising gain of a gamma-ray spectroscopy system, according to some embodiments.

FIG. 2 is a spectrum chart showing spectra for a PR:LuAG crystal. In particular, shown is a 100s spectrum 210 of a 50 mm×100 mm Pr:LuAG crystal, overlaid with a spectrum 212 that has undergone a 5% gain shift. Note that although 100s spectra are shown in FIG. 2, much shorter acquisition times could be used for some applications. FIG. 3 is a flowchart describing a technique for stabilising gain of a gamma-ray spectroscopy system, according to some embodiments. A processing system is used to compare a previously recorded 'standard' spectrum SPCa with a gain (G) and/or offset (O) corrected measured spectrum SPCb(G,O). Here the term SPCb(G,O) indicates symbolically that the original shape of the measured spectrum SPCb is modified by applying gain and offset and thus the resulting spectrum SPCb(G,O) is a function of these two parameters. In step 310, a 'standard' spectrum is generated using a much longer acquisition to minimize statistical errors. In step 312, a current spectrum is measured, which is not yet gain or offset corrected. In step 314, the spectrum is then is normalized to the acquisition time of the measured spectrum. This normalization makes use of the fact that the intrinsic activity is constant over time within the limits of statistical variation. In step 316, a residual res is then be computed between the 'standard' spectrum and the current measured spectrum where a gain and/or offset is applied to the measured spectrum. In step 318, the gain and/or offset corrections are determined. In the simplest case of no interference with other radiation source a minimization routine would be applied to determine the gain (Gmin) and possibly also offset (Offmin) at which the residual is minimal. In step 320, the gain is then be stabilized with the methods known from prior art.

According to some embodiments, where the more complex case of significant other signals interfering with the background spectrum, additional techniques are used to account for the interference. However, in many cases it is possible to assume that the interfering radiation remains essentially constant over a time period that is significantly longer then the time used to update the stabilization circuit (which is typically seconds), such that the described minimization technique can be carried out. According to other embodiments, for some applications the measured radiation is described by a set of standards, and the optimization is extended to a set of gains and relative amplitudes of the standards.

Figure 4:
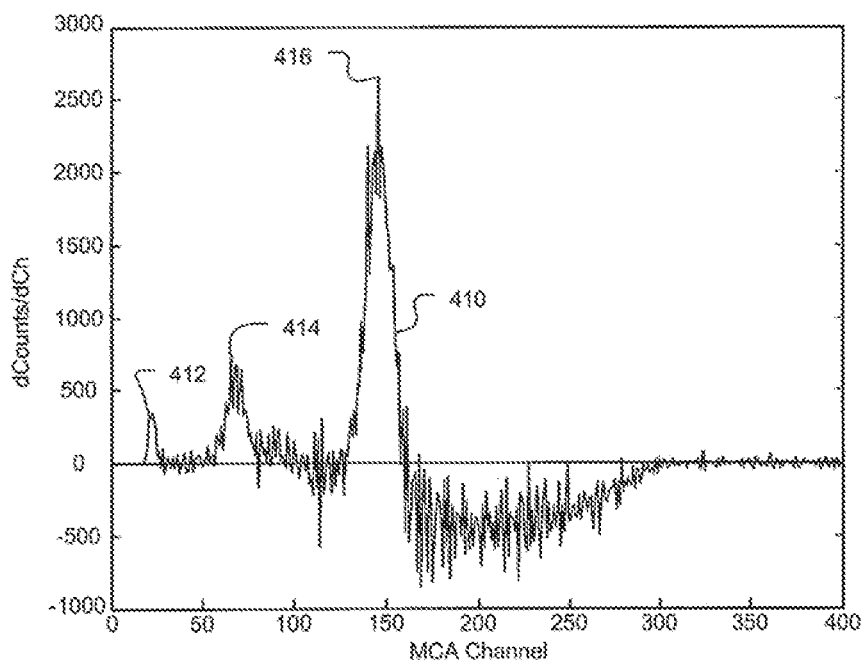
FIG. 4 is a chart showing a differentiated spectrum, according to some embodiments.

According to some embodiments, the differentiated spectrum of the internal radiation is used. Differentiation is a very simple mathematical process, which can easily be handled in most acquisition systems. The resulting differentiated spectrum may have more prominent and localized features than the original spectrum. FIG. 4 is a chart showing a differentiated spectrum, according to some embodiments. Spectrum 410 is a differentiated spectrum computed from spectrum 210 in FIG. 2. The differentiated spectrum 410 of this Pr:LuAG detector show three prominent peaks 412, 414 and 416. According to some embodiments, the detector gain stabilization uses any of the peaks 412, 414 and 416, in combination with a known gains stabilization technique for stabilization sources. An advantage of using a differentiated spectrum is that the peaks can be easily separated from other spectral features that may interfere with the intrinsic background. Note that a full energy or escape peak from a gamma source would show up as a bipolar peak in the differentiated spectrum and a Compton edge appears as a negative peak. According to some embodiments, higher order differentials are used, such as second derivative or third derivative spectra.

Figure 5:
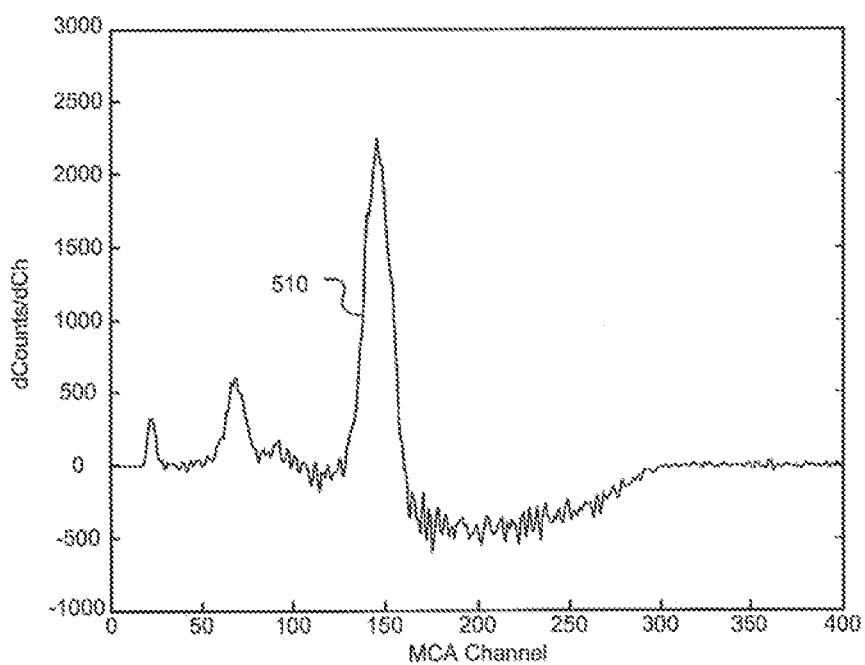
FIG. 5 is a chart showing differentiated spectrum smoothed using a smoothing filter, according to some embodiments.

According to some embodiments additional known techniques may be used to reduce noise and digitization effects on the spectral features for improved gain stabilization. One example for such a technique is a triangular smoothing filter. FIG. 5 is a chart showing differentiated spectrum smoothed using a smoothing filter, according to some embodiments. The effect of ¼-½-¼ filtering on the differentiated spectrum 410 of FIG. 4 is shown in the smoothed spectrum 510 of FIG. 5.

Figure 6:
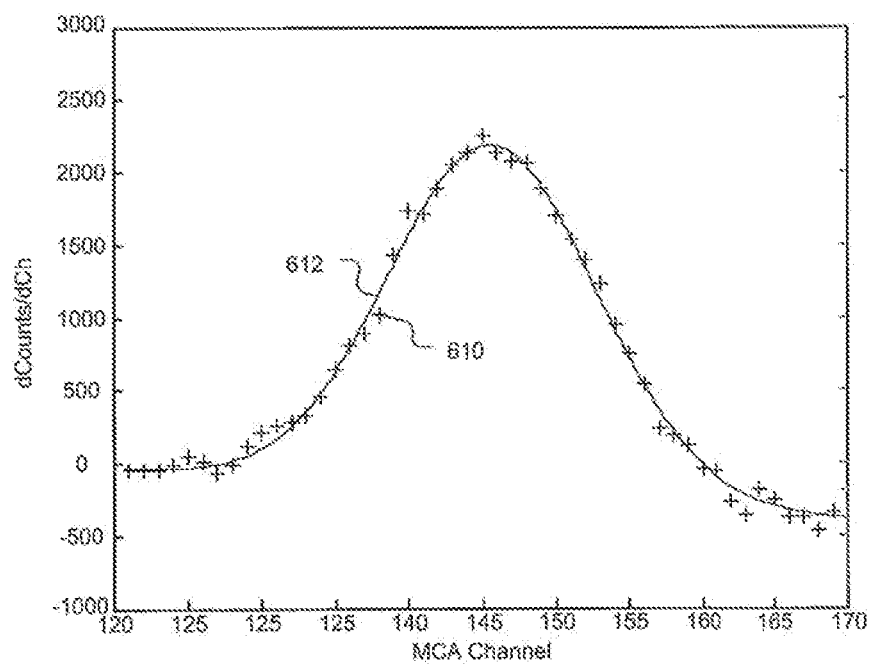
FIG. 6 is a chart showing an example of a fit function used to approximate the peak in a differentiated spectrum.

According to some embodiments, the internal spectrum from the intrinsic radiation of the scintillator material can also be used to accurately monitor the intrinsic detector resolution. This can be important for some measurement applications. For example in geochemical logging, environmental parameters such as temperature have an impact on the detector response function and indirectly influence the accuracy of the determined elemental concentrations. FIG. 6 is a chart showing an example of a fit function used to approximate the peak in a differentiated spectrum. In particular, the data points, shown as "+" signs, such as mark 610 are the differentiated spectrum 510 shown in FIG. 5. The fit curve 612 is shown as resulting from a fit function. According to some embodiments, the width of the fit curve 612 is used to estimate a detector resolution. In cases where the intrinsic spectrum is complex, according to some embodiments, the variation of resolution with peak position is estimated. According to some embodiments, the estimated variation is used to determine problems such as noise or deterioration of the detector.

According to some embodiments, a more complex intrinsic spectrum is used to determine a non-linear energy calibration. The differentiated spectrum 410 of the Pr:LuAG detector in FIG. 4 shows three prominent peaks 412, 414 and 416. According to some embodiments, the detector gain stabilization uses all of the peaks 412, 414 and 414 and optimizes the parameters gain offset and non-linearity until a measured spectrum is best fitted to a previously determined reference spectrum. Since differentiation is a very simple mathematical process, which can easily be handled in most acquisition systems, the use as described herein are particularly well-suited for downhole applications where processing power may be very limited. For example the described techniques are particularly well-suited for applications carried out during and as part of a drilling operation such as MWD and LWD operations.

Although many embodiments are described herein using the first derivative, according to some embodiments, higher order derivatives are in an analogous fashion. For example, according to some embodiments a second derivative of the spectrum is combined with a search for roots based on linear fitting around the intersections of the second derivative with the axis. Such root finding algorithms are known in the art. For example they may search the function for sign changes and then do a local linear interpolation of the data which gives a first order approximation of the root value.

According to some embodiments, the intrinsic radioactivity of certain scintillator materials in a radiation detector is used as a count rate reference or 'intrinsic pulser' for the apparatus containing the radiation detector. Using the scintillator material's intrinsic radioactivity as a count rate reference thus avoids some disadvantages associated with an external count rate reference. The count rate reference can be used to measure a number of properties of the detection system. According to some embodiments, the count rate reference or intrinsic pulser is used for testing functionality of the system without adding additional parts, such as an electronic pulser, or other extrinsic source.

According to some embodiments, the count rate reference or intrinsic pulser is used for precision dead time corrections. This is possible because the intrinsic count rate is perfectly random, but overall very stable in energy and average count rate with only the statistical spread from the total number of decay events in a given time period. With a large detector delivering an average count rate of about 50,000 $s^{-1}$ one has to acquire only 20 s of data to get to a statistical precision of 0.1%. According to some other embodiments, the internal radiation can be used as input for pileup simulation. The randomness of the intrinsic events makes it equivalent to random external radiation events resulting in real pileup events. According to some embodiments, corrections for pileup are based on characterization measurements made in a calibration facility. Characterization measurements could include variable count rate by changing external source strength, controlled variations in the environment, etc.

An advantage over using a conventional external source as a count rate reference is that the intrinsic radioactivity is uniformly distributed throughout the system and therefore the count rate is produced at the same location as the signal. Therefore there are no geometrical or shielding effects that would change the count rate in the system.

As mentioned above, the dead time of the system under exposure to external radiation can be estimated from a comparison with dead time of a reference spectrum of the intrinsically generated radiation. According to some embodiments, the comparison may be based on evaluating count rates in different regions of the spectrum. For example, if only peaks need to be clearly distinguished, then an integration of counts over the region of each peak can be performed without any fitting. According to some embodiments, the comparison is based in part on spectral fitting that includes the use of standard spectra of the intrinsically generated radiation and at least one component form an external radiation source. According to some embodiments, this type of characterization of the dead time of the reference spectrum is performed on a prototype or calibration system well before performing the well log. For example it could be done during the engineering phase of product development. According to other embodiments, the characterization is performed as a calibration step on each system, and can be occasionally repeated in a local workshop.

Figure 7:
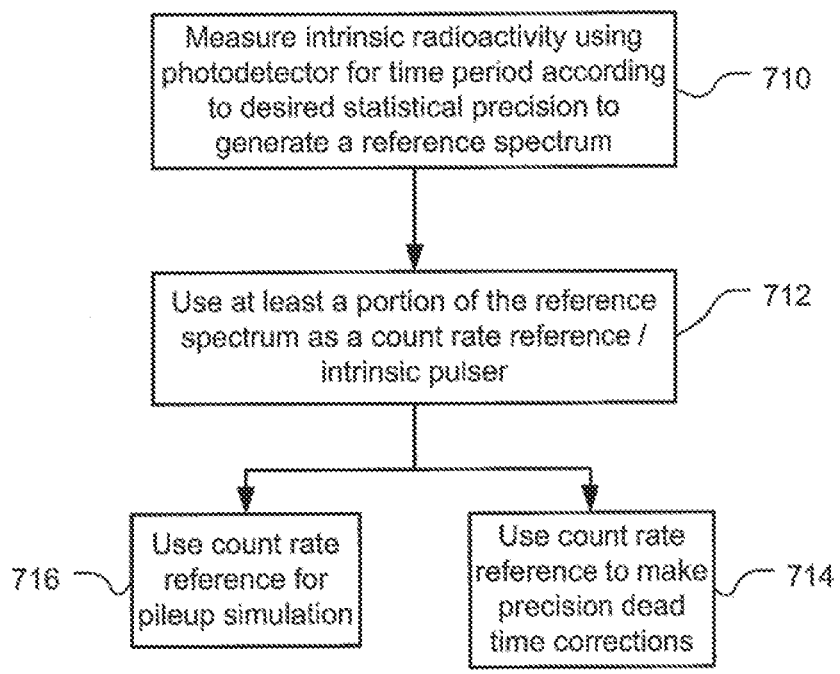
FIG. 7 is a flow chart describing a technique for using intrinsic radiation as a count rate reference, according to some embodiments.

FIG. 7 is a flow chart describing a technique for using intrinsic radiation as a count rate reference, according to some embodiments. In step 710, the intrinsic radioactivity is measured using the system for a time period according to the desired statistic precision to generate a reference spectrum. In step 712, some or all of the reference spectrum is used as count rate reference. As described below, according to some embodiments a portion of the spectrum is used that is known not to be affected by any external radiation. In step 714, the count rate reference is used to make precision dead time corrections. In step 716, the count rate is used for making a pileup simulation.

Note that when compared to an electronic or optical pulser or monoenergetic source, the signal of the intrinsic activity is more spread out in the spectrum and in some cases may overlap with the external spectrum to be measured. However, according to some embodiments this can be overcome by measuring an accurate reference spectrum (also called a standard spectrum) before actively using the detection system to detect gamma rays. The reference spectrum can be completely or partially used to fit those regions in the spectrum that is not affected by the measured external radiation.

Figure 8:
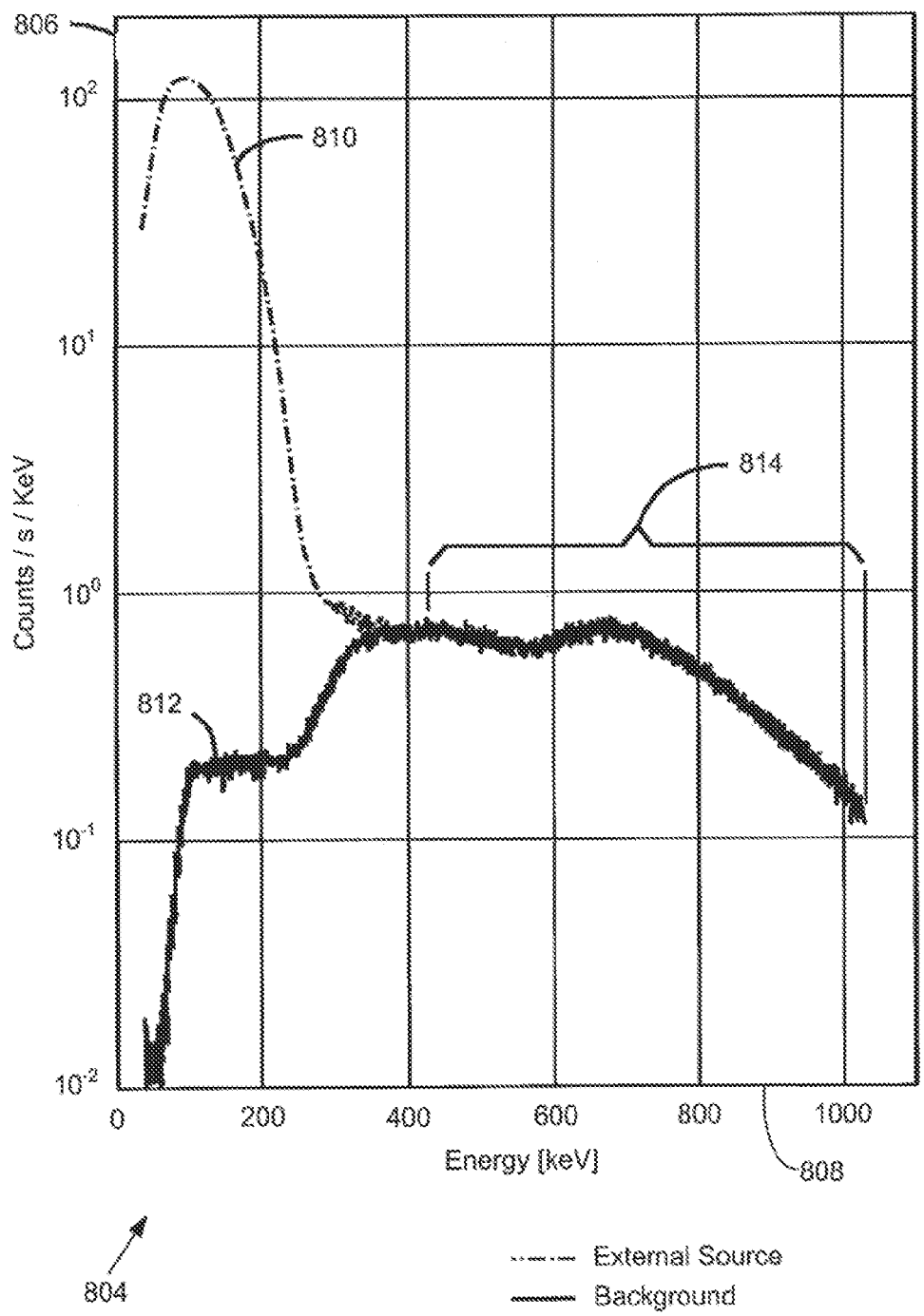
FIG. 8 shows a spectrum chart 804, which may represent the spectrum obtained with the scintillation detector in the presence of external radiation to be measured.

FIG. 8 shows a spectrum chart 804, which may represent the spectrum obtained with the scintillation detector in the presence of external radiation to be measured. The chart 804 includes an ordinate 806 representing counts per second per keV and an abscissa 808 representing energy in keV. An external spectrum 810 illustrates a response to external radiation and an internal spectrum 812 illustrates a response to internal radiation from radioactive components of the scintillator 112. A region 814 represents a region of spectrum unaffected by external radiation. Since the measured external spectrum is a lower energy X-ray spectrum, all the part of the intrinsic spectrum, above the maximal X-ray energy, in region 814, can be used as a count rate reference.

In some cases the measured spectrum may overlap completely with the intrinsic background spectrum. According to some embodiments, in cases where the shape of the external spectrum is known another method is applied. This is for example the case in downhole gamma spectroscopy, where a number of standard spectra can be used to fit all individual external components and an additional standard is used to fit the intrinsic background. The correction of dead time is then determined from the ratio between the fit coefficient with which the reference spectrum has to be multiplied and the ratio between the two live times used in acquiring the reference spectrum and the measured spectrum.

According to some other embodiments, an estimation of pileup in the system is made based on measured intrinsic radiation. For this purpose a number of intrinsic reference spectra are measured where the pileup is created in a well controlled environment for example with a random pulser. The amount of pileup is then related to relative count ratios in two or more windows on the intrinsic spectrum. The details of this processing depend on the energy signature of the external radiation to be measured.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system for the detection of nuclear radiation, the system comprising:
   a scintillator material that intrinsically generates radiation;
   a photodetection system coupled to the scintillator material and adapted to generate electrical signals based on light emitted from the scintillator material; and
   a processing system adapted and programmed to receive the electrical signals, to generate a count rate reference value based at least in part on electrical signals generated in response to the light emitted from the scintillator material due to the intrinsically generated radiation, and to use the count rate reference to correct count rate in a spectrum of measured external radiation.

2. A system according to claim 1, wherein the processing system is further programmed to use the count rate reference to correct for dead time of the system.

3. A system according to claim 2, wherein the dead time of the system is variable and depends on a rate of the measured external radiation.

4. A system according to claim 3, wherein the dead time of the system under exposure to external radiation is estimated from a comparison with dead time of a reference spectrum of the intrinsically generated radiation.

5. A system according to claim 4, wherein the comparison is based in part on evaluating counting rates in different regions of the reference spectrum.

6. A system according to claim 5, wherein the evaluation is based at least in part on integrating counts over one or more peak regions of the reference spectrum.

7. A system according to claim 4, wherein the comparison is based in part on a form of spectral fitting.

8. A system according to claim 7, wherein the spectral fitting is limited to a spectral region not affected by expected external radiation.

9. A system according to claim 7, wherein the spectral fitting includes using standard spectra of the intrinsically generated radiation and at least one component from the spectrum of the measured external radiation.

10. A system according to claim 4, wherein the dead time of the reference spectrum of the intrinsically generated radiation is characterized or calibrated with an external source of known strength.

11. A system according to claim 4, wherein the dead time of the reference spectrum of the intrinsically generated radiation is characterized or calibrated by comparing the dead time with a reference spectrum of a substantially smaller crystal having similar resolution and that has negligible dead time.

12. A system according to claim 4, wherein the dead time of the reference spectrum of the intrinsically generated radiation is computed from independently known properties of electronics within the system.

13. A system according to claim 12, wherein the dead time of the reference spectrum of the intrinsically generated radiation is estimated from a series of measurements with varying electronic shaping times.

14. A system according to claim 1, wherein the processing system is further programmed to use the count rate reference for pileup measurement.

15. A system according to claim 14, wherein the processing system is processing system is further programmed to make corrections for pileup.

16. A system according to claim 15, wherein the corrections for pileup are based on measurements made in a calibration facility.

17. A system according to claim 15, wherein the corrections for pileup are based on a modeling simulation of processing within the system.

18. A system according to claim 1, further comprising a tool body adapted to be deployed downhole, the tool body housing at least the scintillator and the photodetection system.

19. A system according to claim 1, wherein the processing system is further programmed to count radiation events above a predetermined threshold.

20. A system according to claim 1, wherein the processing system is further programmed to determine a pulse height spectrum of the measured external radiation.

21. A system according to claim 1, wherein the scintillator material is a matrix, a substantial part of which is one or more rare-earth elements.

22. A system according to claim 21, wherein a substantial part of the matrix is Lanthanum.

23. A system according to claim 21, wherein a substantial part of the matrix is Lutetium or a Lutetium compound.

24. A system according to claim 21, wherein a substantial part of the matrix is Lutetium aluminate essentially in the perovskite phase.

25. A system according to claim 21, wherein a substantial part of the matrix is Lutetium essentially in the garnet phase.

26. A system according to claim 21, wherein the matrix is doped with an activator.

27. A system according to claim 26, wherein the activator is Cerium or Praseodymium.

28. A method for the detection of nuclear radiation, the method comprising:
generating electrical signals using a photodetection system based on light emitted from a scintillator material that intrinsically generates radiation;
generating a count rate reference value based at least in part on electrical signals generated in response to the light emitted from the scintillator material due to the intrinsically generated radiation; and
using the count rate reference to correct count rate in a spectrum of measured external radiation.

29. A method according to claim 28, further comprising using the count rate reference to correct for dead time of a system that includes the scintillator material and the photodetection system.

30. A method according to claim 29, wherein the dead time is variable and depends on a rate of measured external radiation.

31. A method according to claim 30, wherein the dead time under exposure to external radiation is estimated from a comparison with dead time of a reference spectrum of the intrinsically generated radiation.

32. A method according to claim 31, wherein the comparison is based in part on evaluating counting rates in different regions of the reference spectrum.

33. A method according to claim 32, wherein the evaluation is based at least in part on integrating counts over one or more peak regions of the reference spectrum.

34. A method according to claim 31, wherein the comparison is based in part on a form of spectral fitting.

35. A method according to claim 34, wherein the spectral fitting is limited to a spectral region not affected by expected external radiation.

36. A method according to claim 34, wherein the spectral fitting includes using standard spectra of the intrinsically generated radiation and at least one component from the spectrum of the measured external radiation.

37. A method according to claim 31, wherein the dead time of the reference spectrum of the intrinsically generated radiation is measured with an external source of known strength.

38. A method according to claim 31, wherein the dead time of the reference spectrum of the intrinsically generated radiation is characterized or calibrated by comparing the dead time with a reference spectrum of a substantially smaller crystal having similar resolution and that has negligible dead time.

39. A method according to claim 31, wherein the dead time of the reference spectrum of the intrinsically generated radiation is computed from independently known properties of electronics within the system.

40. A method according to claim 39, wherein the dead time of the reference spectrum of the intrinsically generated radiation is estimated from a series of measurements with varying electronic shaping times.

41. A method according to claim 28, further comprising using the count rate reference for pileup measurement.

42. A method according to claim 41, further comprising making corrections for pileup.

43. A method according to claim 42, wherein the corrections for pileup are based on measurements made in a calibration facility.

44. A method according to claim 42, wherein the corrections for pileup are based on a modeling simulation of processing within the system.

45. A method according to claim 28, further comprising deploying a tool body in a wellbore, the tool body housing the scintillator material and the photodetection system.

46. A method according to claim 28, further comprising counting radiation events above a predetermined threshold.

47. A method according to claim 28, further comprising determining a pulse height spectrum of the measured external radiation.

48. A method according to claim 28, wherein the scintillator material is a matrix, a substantial part of which is one or more rare-earth elements.

49. A method according to claim 48, wherein a substantial part of the matrix is Lanthanum.

* * * * *